United States Patent
Iwamura et al.

(10) Patent No.: US 8,565,761 B2
(45) Date of Patent: *Oct. 22, 2013

(54) MOBILE COMMUNICATION METHOD AND RADIO BASE STATION

(75) Inventors: Mikio Iwamura, Tokyo (JP); Sadayuki Abeta, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 13/147,338

(22) PCT Filed: Feb. 2, 2010

(86) PCT No.: PCT/JP2010/051399
§ 371 (c)(1),
(2), (4) Date: Sep. 20, 2011

(87) PCT Pub. No.: WO2010/087492
PCT Pub. Date: Aug. 5, 2010

(65) Prior Publication Data
US 2012/0003977 A1     Jan. 5, 2012

(30) Foreign Application Priority Data

Feb. 2, 2009   (JP) ................ 2009-022065
Feb. 6, 2009   (JP) ................ 2009-026605

(51) Int. Cl.
*H04W 4/00*     (2009.01)

(52) U.S. Cl.
USPC ........ 455/433; 455/438; 455/442; 455/422.1; 455/449; 455/444; 370/331; 370/338

(58) Field of Classification Search
USPC ........... 455/411, 420, 432.1, 435.1, 436, 446, 455/453, 466; 370/328, 338, 348, 350
See application file for complete search history.

(56) References Cited

U.S. PATENT DOCUMENTS

2006/0189308 A1   8/2006   Kurata et al.
2008/0039092 A1*   2/2008   Kitazoe .............. 455/436
(Continued)

FOREIGN PATENT DOCUMENTS

CN    1816185 A    8/2006
JP    2006-217051 A    8/2006

OTHER PUBLICATIONS

Qualcomm Europe, "AS re-keying in case of inter-cell handover," 3GPP TSG-RAN WG2 meeting #64bis, R2-090065, Jan. 12-16, 2009, 8 pages.

(Continued)

*Primary Examiner* — Mahendra Patel
*Assistant Examiner* — Quan M Hua
(74) *Attorney, Agent, or Firm* — Osha Liang LLP

(57) ABSTRACT

A mobile communication method according to the present invention includes steps of: performing, at a mobile station (UE) having established a first connection in a first cell, a cell selection process when detecting failure in the first connection; transmitting, from the mobile station (UE) to a second cell selected by the cell selection process, a connection re-establishment request signal; determining, at the radio base station managing the second cell, whether or not to have stored context information of the mobile station (UE) having transmitted the connection re-establishment request signal; acquiring, at the radio base station managing the second cell, the context information of the mobile station from a radio base station managing the first cell, when the radio base station managing the second cell determines that it does not store the context information of the mobile station (UE).

9 Claims, 13 Drawing Sheets

(56) References Cited

U.S. PATENT DOCUMENTS

| | | | |
|---|---|---|---|
| 2008/0261600 A1* | 10/2008 | Somasundaram et al. | 455/436 |
| 2009/0149162 A1* | 6/2009 | Tenny | 455/414.1 |
| 2009/0191874 A1* | 7/2009 | Du et al. | 455/436 |
| 2011/0292790 A1* | 12/2011 | Iwamura et al. | 370/225 |

OTHER PUBLICATIONS

NTT Docomo, Inc., "Short MAC-I for re-establishment request," 3GPP TSG RAN WG2 #63, R2-084421, Aug. 18-22, 2008, 8 pages.

3GPP TS 36.331 V8.3.0, Sep. 2008, 3rd Generation Partnership Project; Technical Specification Group Radio Access Network; Evolved Universal Terrestrial Radio Access (E-UTRA) Radio Resource Control (RRC); Protocol specification (Release 8), 178 pages.

3GPP TS 36.321 V8.3.0, Sep. 2008, 3rd Generation Partnership Project; Technical Specification Group Radio Access Network; Evolved Universal Terrestrial Radio Access (E-UTRA) Medium Access Control (MAC) protocol specification (Release 8), 36 pages.

International Search Report issued in PCT/JP2010/051399, mailed on May 18, 2010, with translation, 4 pages.

Office Action issued in Chinese Patent Application No. 201080006277.5, dated Jun. 18, 2013, with English translation thereon (9 pages).

* cited by examiner

FIG. 3

ShortMAC-I

The IE ShortMAC-I is used to identify and verify the UE at RRC connection re-establishment.

ShortMAC-I information element

```
-- ASN1START

ShortMAC-I ::=                BIT STRING ( SIZE (16) )

-- ASN1STOP
```

ShortMAC-I field descriptions

| ShortMAC-I |
|---|
| The 16 least significant bits of the MAC-I calculated using the security configuration of the source cell, as specified in 5.3.7.4. |

– VarShortMAC-Input

The UE variable VarShortMAC-Input specifies the input used to generate the shortMAC-I. The UE shall store the variable in accordance with the ASN.1 specified in the following.

VarShortMAC-Input UE variable

```
-- ASN1START

VarShortMAC-Input ::=      SEQUENCE [
     cellIdentity                    CellIdentity,
     physicalCellIdentity            PhysicalCellIdentity,
     c-RNTI                          C-RNTI
}

-- ASN1STOP
```

VarShortMAC-Input field descriptions

| cellIdentity |
|---|
| Set to CellIdentity of the current cell. |
| physicalCellIdentity |
| Set to PhysicalCellIdentity of the cell the UE was connected to prior to the failure. |
| c-RNTI |
| Set to C-RNTI that the UE had in the cell it was connected to prior to the failure. |

FIG. 4

AS-Context
The IE AS-Context is used to tansfer local E-UTRAN context required by the target node.

AS-Context information element

```
-- ASN1START

As-Context ::=                    SEQUENCE {
    ue-RadioAccessCapabilityInfo      OCTET STRING ( CONTAINING UECapabilityInformation ) ,
    ue-SecurityCapabilityInfo         OCTET STRING,
    reestabishmentInfo                ReestablishmentInfo
}

-- ASN1STOP
```

| AS-Context field descriptions |
|---|
| ue-RadioAccessCapabilityInfo<br>Including E-UTRA, GERAN and UTRA radio acess capabilities (separated) |
| ue-SecurityCapabilityInfo<br>UE security capability information as specified in TS 36.413 [39]. |
| reestablishmentInfo<br>Including information needed for the RRC connection re-establishment |

- ReestablishmentInfo

The ReestablishmentInfo IE contains information needed for the RRC connection re-establishment.

ReestablishmentInfo information element

```
-- ASN1START

ReestablishmentInfo ::=          SEQUENCE {
    sourcePhysicalCellIdentity       PhysicalCellIdentity,
    targetCellShortMAC-I             ShortMAC-I,
    additionalReestabInfoList        AdditionalReestabInfoList            OPTIONAL,
    ...
}

AdditionalReestabInfoList ::=    SEQUENCE ( SIZE (1. .maxReestabInfo ) ) OF SEQUENCE {
    cellIdentity                     CellIdentity,
    key-eNodeB-Star                  Key-eNodeB-Star,
    shortMAC-I                       ShortMAC-I
}
-- ASN1STOP
```

| ReestablishmentInfo field descriptions |
|---|
| sourcePhysicalCellIdentity<br>The physical cell identity of the source cell, used to determine the UE context in the target eNB at re-establishment. |
| targetCellShortMAC-I<br>The ShortMAC-I for the handover target cell, in order for potential re-establishment to succeed. |
| additionalReeatabInfoList<br>Contains a list of ShortMAC-I and KeNB* for cells under control of the target eNB, required for potential re-establishment by the UE in these cells to succeed. |

FIG. 5

RRCConnectionReestablishmentRequest
The RRCConnectionReestablishmentRequest message is used to request the reestablishment of an RRC connection.
Signalling radio bearer: SRB0
RLC-SAP: TM
Logical channel: CCCH
Direction: UE to E-UTRAN RRCConnectionReestablishmentRequest message

```
-- ASN1START

RRCConnectionReestablishmentRequest ::=    SEQUENCE {
    criticalExtensions                     CHOICE {
        rrcConnectionReestablishmentRequest-r8     RRCConnectionReestablishmentRequest-r8-IEs,
        criticalExtensionsFuture           SEQUENCE {}
    }
}

RRCConnectionReestablishmentRequest-r8-IEs ::= SEQUENCE {
    ue-Identity                            ReestabUE-Identity,
    reestablishmentCause                   ReestablishmentCause,
    transId                                RRC-TransactionIdentifier
}

ReestabUE-Identity ::=                     SEQUENCE {
    c-RNTI                                 C-RNTI,
    physCellIdentity                       PhysicalCellIdentity,
    shortMAC-I                             ShortMAC-I
}

ReestablishmentCause ::=                   ENUMERATED {
                                           reconfigurationFailure, handoverFailure,
                                           otherFailure, spare }

-- ASN1STOP
```

| RRCConnectionReestablishmentRequest field descriptions |
|---|
| ue-Identity<br>UE identity included to retrieve UE context and to facilitate contention resolution by lower layers |
| ReestablishmentCause<br>Indicates the failure cause that triggered the re-establishment procedure. |
| physCellIdentity<br>The Physical Cell Identity of the cell the UE was connected to prior to the failure. |

FIG. 6

HANDOVER PREPARATION INFORMATION

E-UTRA RRC information used by the target eNB during handover preparation, including UE capability information
Transfer characteristics: tbs HandoverPreparationInformation message

```
-- ASN1START

HandoverPreparationInformation ::= SEQUENCE {
    criticalExtensions              CHOICE {
        c1                          CHOICE {
            handoverPreparationInformation-r8    HandoverPreparationInformation-r8-IEs,
            spare7 NULL,
            spare6 NULL, spare5 NULL, spare4 NULL,
            spare3 NULL, spare2 NULL, spare1 NULL
        },
        criticalExtensionsFuture    SEQUENCE {}
    }
}

HandoverPreparationInformation-r8-IEs ::= SEQUENCE {
    as-Configuration                                OPTIONAL,
    rrm-Configuration                               OPTIONAL,
    as-Context,
    nonCriticalExtention            SEQUENCE {}    OPTIONAL,
}

-- ASN1STOP
```

| HandoverPreparationInformation field descriptions |
|---|
| as-Configuration<br>The complete radio resource configuration. Applicable in case of intra-E-UTRA handover. |
| rrm-Configuration<br>Local E-UTRAN context used depending on the target node's implementation, which is mainly used for the RRM purpose. FFS if applicable for Inter-RAT HO |
| as-Cotext<br>Local E-UTRAN context required by the target node. |

FIG. 7

AS-Configuration

The AS-Configuration IE contains information about RRC configuration information in the source cell which can be utilized by target cell to determine the need to change the RRC configuration during the handover preparation phase. The information can also be used after the handover is successfully performed or during the RRC connection re-establishment.

AS-Configuration information element

```
-- ASN1START

AS-Configuration ::=        SEQUENCE [
    sourceMeasurementConfiguration      MeasurementConfiguration,
    sourceRadioResourceConfiguration    RadioResourceConfigDedicated,
    sourceSecurityConfiguration         SecurityConfiguration,
    sourceUE-Identity                   C-RNTI,
    sourceMasterInformationBlock        MasterInformationBlock,
    sourceSystemInformationBlockType1   SystemInformationBlockType1,
    sourceSystemInformationBlockType2   SystemInformationBlockType2,
    antennaInformationCommon            AntennaInformationCommon,
...
]

-- ASN1STOP
```

NOTE    The AS-Configuration re-uses information elements primarily created to cover the radio interface signalling requirements. Consequently, the information elements may include some parameters that are not relevant for the target eNB e.g. the SFN as included in the MasterInformationBlock.

| AS-Configuration field descriptions |
|---|
| sourceMeasurementConfiguration<br>Measurement configuration in the source cell. The measurement configuration for all measurements existing in the source cell when handover is triggered shall be included. See 10.5. |
| sourceRadioResourceConfiguration<br>Radio configuration in the source cell. The radio resource configuration for all radio bearers existing in the source cell when handover is triggered shall be included. See 10.5. |
| sourceSecurityConfiguration<br>This field provides the AS integrity protection (CP) and AS ciphering (CP and UP) configuration and the next hop chaining count used in the source cell. |
| sourceMasterInformationBlock<br>MasterInformationBlock transmitted in the source cell. |
| sourceSystemInformationBlockType1<br>SystemInformationBlockType1 transmitted in the source cell. |
| sourceSystemInformationBlockType2<br>SystemInformationBlockType2 transmitted in the source cell. |
| antennaInformationCommon<br>This field provides information about the number of antenna ports the source cell. |

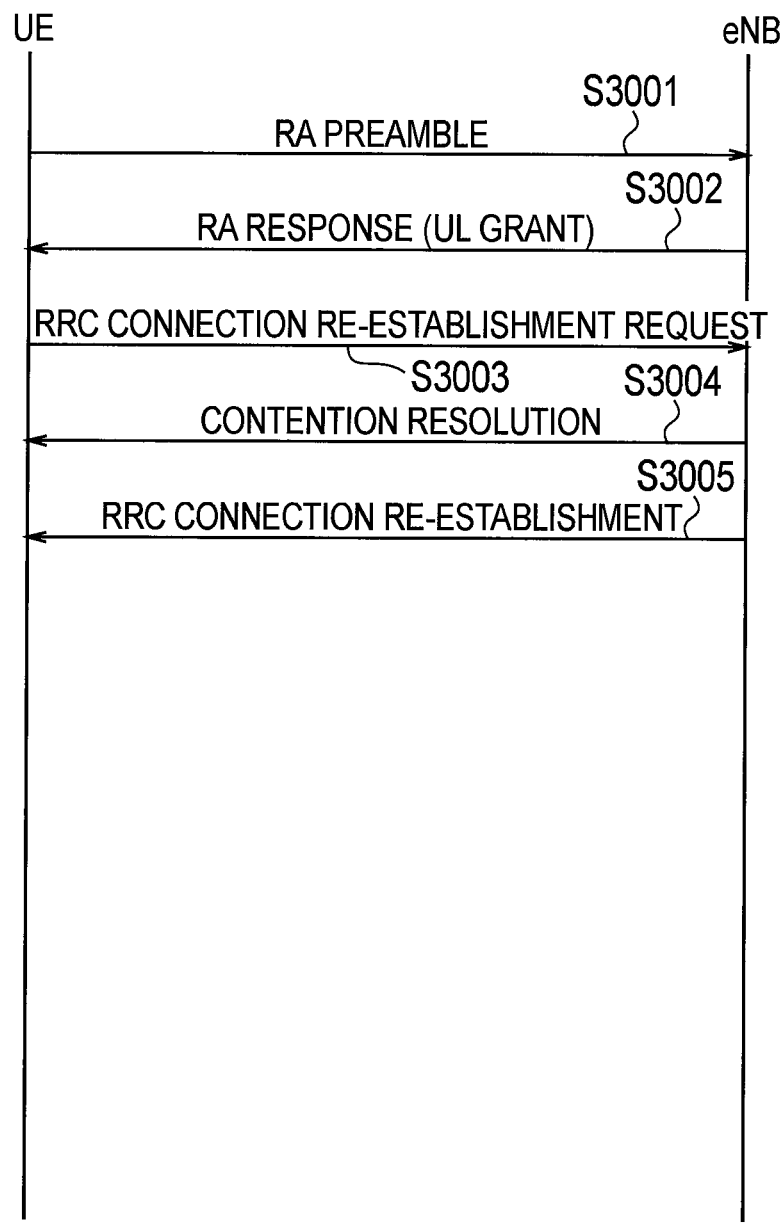

MOBILE COMMUNICATION METHOD AND RADIO BASE STATION

TECHNICAL FIELD

The present invention relates to a mobile communication method and a radio base station.

BACKGROUND ART

With reference to FIG. 14, an operation when a mobile station UE having established an RRC connection #1 in a cell #1 detects RLF (Radio Link Failure) in a mobile communication system of the LTE (Long Term Evolution) scheme defined in the 3GPP will be explained.

As illustrated in FIG. 14, in the state in which the RRC connection #1 is established between the mobile station UE and a radio base station eNB#1 and an S1 connection #1 is established between the radio base station eNB#1 and a mobile switching center MME, if the mobile station UE detects the RLF (Radio Link Failure) in step S5001, the mobile station UE performs a cell selection process in step S5002.

In step S5003, the mobile station UE transmits an "RRC Connection Re-establishment Request" to a radio base station eNB#2 managing a cell #2 selected by the cell selection process.

When the radio base station eNB#2 stores context information (UE context) of the mobile station UE, which corresponds to "Physical Cell Identity", "C-RNTI", and "short-MAC-I" included in the received "RRC Connection Re-establishment Request" in step S5004, the radio base station eNB#2 transmits an "RRC Connection Re-establishment" to the mobile station UE in step S5005.

In step S5006, the mobile station UE transmits an "RRC Connection Re-establishment Complete" to the radio base station eNB#2.

The radio base station eNB#2 transmits an "S1 Path Switch" to the mobile switching center MME in step S5007, and transmits an "RRC Connection Reconfiguration" to the mobile station UE in step S5008.

The mobile station UE transmits an "RRC Connection Reconfiguration Complete" to the radio base station eNB#2 in step S5009, and the mobile switching center MME transmits an "S1 Path Switch Ack" to the radio base station eNB#2 in step S5010.

As a consequence, the RRC connection #1 is switched to an RRC connection #2 and the S1 connection #1 is switched to an S1 connection #2. Here, the RRC connection #2 is an RRC connection established between the mobile station UE and the radio base station eNB#2, and the S1 connection #2 is an S1 connection established between the radio base station eNB#2 and the mobile switching center MME.

However, in the mobile communication system, the mobile station UE is configured to perform a handover only for a cell under the control of a radio base station eNB storing the context information (UE context) of the mobile station UE.

Therefore, there is a problem that when the above-mentioned radio base station eNB#2 does not store the context information of the mobile station UE, the above-mentioned "RRC Connection Re-establishment" may be rejected, and the mobile station UE may not establish the RRC connection #2 with the radio base station eNB#2 managing the cell #2 selected by the cell selection process.

Therefore, the present invention is intended to overcome the above-described problems. An object thereof is to provide a mobile communication method of enabling connection re-establishment (reconnection) with a radio base station not storing the context information of a mobile station, and a radio base station therefor.

SUMMARY OF THE INVENTION

A first aspect of the present invention is summarized as a mobile communication method including the steps of: (A) performing, at a mobile station having established a first connection in a first cell, a modification process to modify a configuration of the first connection, in response to a reconfiguration signal from a radio base station managing the first cell; (B) storing, at the mobile station, transaction identification information included in the reconfiguration signal, and transmitting, from the mobile station to the radio base station managing the first cell, a reconfiguration complete signal including the stored transaction identification information, when succeeding in the modification process; (C) performing, at the mobile station, a cell selection process when detecting failure in the first connection; (D) transmitting, from the mobile station to a radio base station managing a second cell selected by the cell selection process, a connection re-establishment request signal including the transaction identification information and a security parameter for specifying the first cell and the mobile station; (E) determining, at the radio base station managing the second cell, whether or not to have stored context information of the mobile station having transmitted the connection re-establishment request signal; (F) transmitting, from the radio base station managing the second cell to the radio base station managing the first cell, a context request signal including the transaction identification information and the security parameter, when the radio base station managing the second cell determines that it does not store the context information of the mobile station; (G) specifying, at the radio base station managing the first cell which has received the context request signal, the context information of the mobile station based on the transaction identification information and the security parameter, and transferring, from the radio base station managing the first cell to the radio base station managing the second cell, the specified context information of the mobile station; and (H) establishing, at the radio base station managing the second cell and the mobile station, a second connection in the second cell for the mobile station based on the context information of the mobile station.

In the first aspect of the present invention, in the step (E), the radio base station managing the second cell may determine whether or not the context information of the mobile station is stored based on a combination of the transaction identification information and the security parameter included in the connection re-establishment request signal.

A second aspect of the present invention is summarized as a radio base station managing a second cell, including: a determination unit configured to determine whether or not context information of a mobile station is stored based on a combination of transaction identification information and a security parameter for specifying a first cell and the mobile station, which are included in a connection re-establishment request signal destined to the second cell and received from the mobile station having established a first connection in the first cell; an acquisition unit configured to acquire the context information of the mobile station from a radio base station managing the first cell, when it is determined by the determination unit that the context information of the mobile station is not stored; and an establishment unit configured to establish second connection in the second cell for the mobile station in cooperation with the mobile station based on the context information of the mobile station, wherein the transaction identification information is configured such that the transaction identification information is to be updated in a case of a successful process to modify a configuration of the first connection in the mobile station.

A third aspect of the present invention is summarized as a radio base station managing a first cell, including: a notification unit configured to update transaction identification information in a case of succeeding in a process to modify a configuration of a first connection established between the radio base station and a mobile station in the first cell, and to notify, to a radio base station managing a second cell, the updated transaction identification information at an arbitrary timing.

As described above, according to the present invention, it is possible to provide a mobile communication method of enabling connection re-establishment (reconnection) with a radio base station not storing the context information of a mobile station, and a radio base station therefor.

BRIEF DESCRIPTION OF THE DRAWINGS

FIG. 3 is a diagram explaining "shortMAC-I" used in the mobile communication system according to the first embodiment of the present invention.

FIG. 4 is a diagram explaining "AS-Context" used in the mobile communication system according to the first embodiment of the present invention.

FIG. 5 is a diagram explaining "RRC Connection Re-establishment Request" used in the mobile communication system according to the first embodiment of the present invention.

FIG. 6 is a diagram explaining "X2 HO Preparation" used in the mobile communication system according to the first embodiment of the present invention.

FIG. 7 is a diagram explaining "AS-Configuration" included in the "X2 HO Preparation" used in the mobile communication system according to the first embodiment of the present invention.

FIG. 10 is a sequence chart illustrating the operation of the mobile communication system according to a first modification of the present invention.

DETAILED DESCRIPTION

Configuration of Mobile Communication System According to First Embodiment of the Present Invention With reference to FIG. 1 to FIG. 7, the configuration of a mobile communication system according to a first embodiment of the present invention will be explained.

Figure 1:
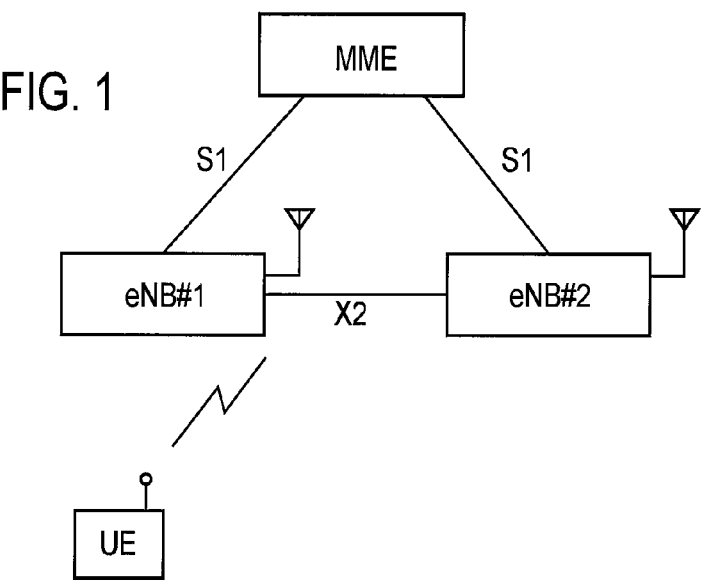
FIG. 1 is a diagram showing the entire configuration of a mobile communication system according to a first embodiment of the present invention.

As illustrated in FIG. 1, the mobile communication system according to the present embodiment is a mobile communication system of the LTE scheme, and includes a mobile switching center MME, a radio base station eNB#1 managing a cell #1, and a radio base station eNB#2 managing a cell #2.

In the mobile communication system, a mobile station UE is configured to perform a handover only for a cell under the control of a radio base station eNB storing the context information of the mobile station UE, that is, a "Backward Handover" is applied.

It is noted that the present invention can be applied to an arbitrary mobile communication system in which a handover is performed between radio base stations eNBs, as well as the mobile communication system of the LTE scheme.

Figure 2:
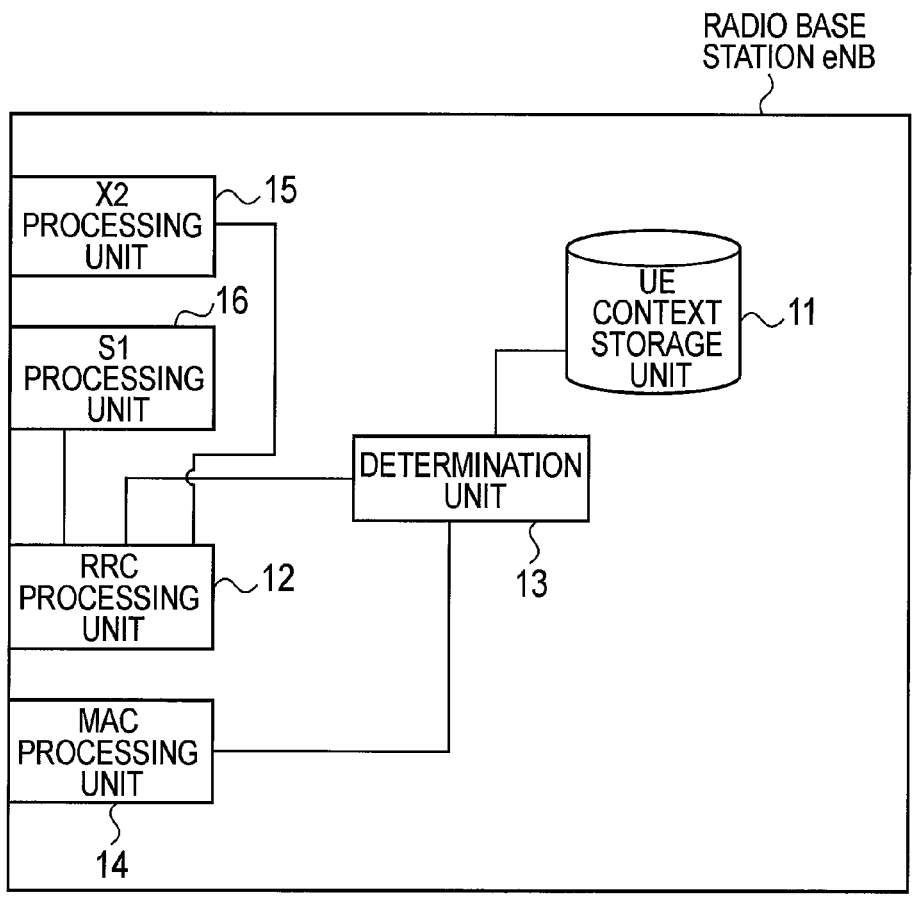
FIG. 2 is a functional block diagram of a radio base station according to the first embodiment of the present invention.

As illustrated in FIG. 2, the radio base stations eNB includes a UE context storage unit 11, an RRC (Radio Resource Control) processing unit 12, a determination unit 13, an MAC (Media Access Control) processing unit 14, an X2 processing unit 15, and an S1 processing unit 16. Hereinafter, the configuration of the radio base station eNB#2 managing the cell #2 (a second cell) will be explained as a representative of the radio base station eNB.

The UE context storage unit 11 is configured to store "PCI (Physical Cell ID)", "C-RNTI", "shortMAC-I", and "transId", which can uniquely specify the mobile station UE in the radio base station eNB, as the context information of the mobile station UE.

The "PCI" denotes an identifier necessary for identifying a cell in a physical layer, and 504 types of "PCIS" are repeatedly used in the LTE scheme. Furthermore, the "C-RNTI" denotes an identifier necessary for uniquely identifying the mobile station UE in the cell.

Here, as illustrated in FIG. 3, the "shortMAC-I" denotes a 16-bit security parameter generated using "VarShortMAC-Input" including a "cell ID (an ID broadcasted in a cell trying re-establishment)", "PCI (PCI of a cell where RLF has occurred)", and "C-RNTI (C-RNTI used in the cell where the RLF has occurred)".

Specifically, the "shortMAC-I" is obtained by extracting lower 16 bits of a falsification check code "MAC-I" calculated using a security key and a security algorithm, which are currently used by the mobile station UE, with respect to the "VarShortMAC-Input".

It is noted that the "transId" may also be called "rrc-TransactionIdentifier".

Further, the context information of the mobile station UE includes various pieces of information related to the setting of the mobile station UE such as information on a radio bearer currently established for the mobile station UE or setting information related to radio measurement of the mobile station UE.

For example, the context information of the mobile station UE may include "AS-Context" and the like, which includes "ue-RadioAccessCapabilityInfo", "ue-SecurityCapabilityInfo", and "reestablishmentInfo" as illustrated in FIG. 4.

Further, the "transId" is managed in each connection and denotes identification information updated in the case of succeeding in a process to modify the configuration of each connection in the mobile station UE. The "transId" included in a downlink message, which has been successfully processed by the mobile station UE, is held. A value may be freely set by the radio base station eNB in the "transId" included in the downlink message. However, it is ordinary that the value is incremented in each reconfiguration.

It is noted that in the reconfiguration, the addition and the deletion of a radio bearer, a modification in a parameter of the radio bearer, setting of radio measurement and the like are performed.

The RRC processing unit 12 is configured to perform an RRC process in cooperation with an RRC function of the mobile station UE.

For example, the RRC processing unit 12 is configured to receive an "RRC Connection Re-establishment Request (a connection re-establishment request signal)", an "RRC Connection Re-establishment Complete (a connection re-establishment complete signal)", and an "RRC Connection Reconfiguration Complete (a connection reconfiguration complete signal)", which are destined to a cell (e.g., the cell #2) under the control of the radio base station eNB, from the mobile station UE.

Further, the RRC processing unit 12 is configured to transmit an "RRC Connection Re-establishment (a connection re-establishment signal)" and an "RRC Connection Reconfiguration (a connection reconfiguration signal)" to the mobile station UE.

It is noted that the RRC processing unit 12 is configured to establish the RRC connection #2 in the cell #2 for the mobile station UE, by exchanging the above-mentioned RRC message in cooperation with the mobile station UE, that is, between the RRC processing unit 12 and the mobile station UE, based on the context information of the mobile station UE.

FIG. 5 illustrates an example of the format of the "RRC Connection Re-establishment Request".

The determination unit 13 is configured to determine whether or not the context information of the mobile station UE is stored in the UE context storage unit 11, in response to the "RRC Connection Re-establishment Request" received in the RRC processing unit 12.

Specifically, the determination unit 13 is configured to determine whether or not the context information of the mobile station UE, which corresponds to the "PCI", the "C-RNTI", the "shortMAC-I", and the "transId" included in the "RRC Connection Re-establishment Request" received in the RRC processing unit 12, is stored in the UE context storage unit 11.

The MAC processing unit 14 is configured to perform an MAC process in cooperation with an MAC function of the mobile station UE.

The X2 processing unit 15 is configured to perform an interface function between the radio base station eNB#2 and another radio base station (e.g., the radio base station eNB#1).

For example, when the determination unit 13 determines that the context information of the mobile station UE is not stored in the UE context storage unit 11, the X2 processing unit 15 is configured to acquire the context information of the mobile station UE from the radio base station eNB#1 managing the cell #1.

Specifically, when the determination unit 13 determines that the context information of the mobile station UE is not stored, the X2 processing unit 15 transmits a "Forward HO request (a forward handover request signal)" including the "PCI", the "C-RNTI", the "shortMAC-I", and the "transId" to the radio base station eNB#1, thereby acquiring the context information of the mobile station UE via "X2 HO preparation (a handover preparation signal)".

FIG. 6 and FIG. 7 illustrate an example of the format of the "X2 HO preparation".

The S1 processing unit 16 is configured to perform an interface function between the radio base station eNB#2 and the mobile switching center MME. It is noted that the S1 processing unit 16 is configured to perform the management of setting the S1 connection between the radio base station eNB#2 and the mobile switching center MME.

For example, the S1 processing unit 16 is configured to transmit an "S1 Path Switch" to the mobile switching center MME, and to receive an "S1 Path Switch Ack" from the mobile switching center MME.

Operation of Mobile Communication System According to First Embodiment of the Present Invention Firstly, with reference to FIG. 8, an operation example 1 of the mobile communication system according to the first embodiment of the present invention will be explained.

Figure 8:
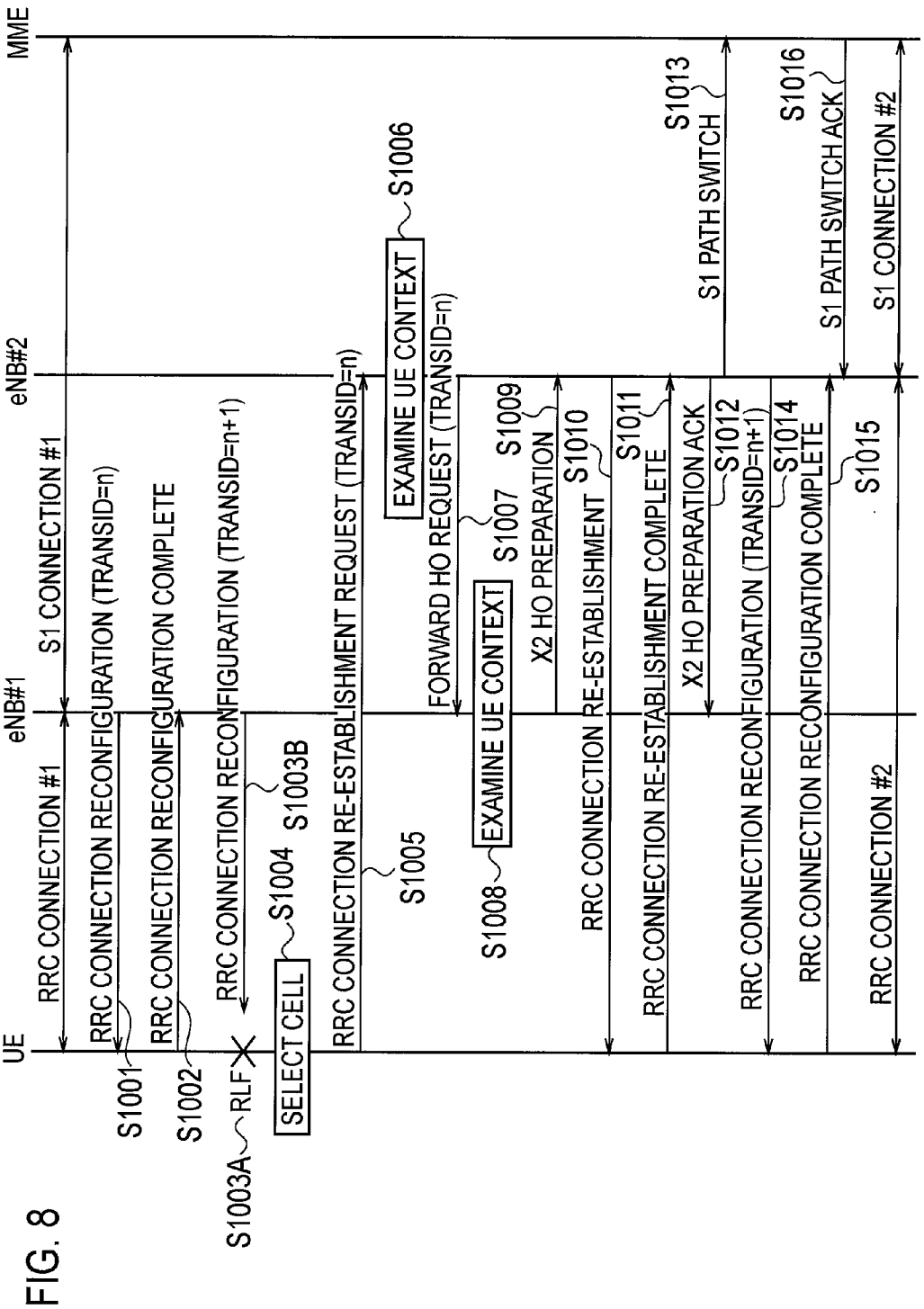
FIG. 8 is a sequence chart illustrating an operation of the mobile communication system according to the first embodiment of the present invention.

As illustrated in FIG. 8, in the state in which the RRC connection #1 is established between the mobile station UE and the radio base station eNB#1 and the S1 connection #1 is established between the radio base station eNB#1 and the mobile switching center MME, the radio base station eNB#1 managing the cell #1 transmits the "RRC Connection Reconfiguration" including the "transId(=n)" to the mobile station UE in order to modify (including add or release) the configuration of a connection (a radio bearer) of the mobile station UE in step S1001.

The mobile station UE performs the process (e.g., addition and deletion of the radio bearer) to modify the configuration of the connection in response to the "RRC Connection Reconfiguration". In the case of succeeding in the modification process, the mobile station UE transmits the "RRC Connection Reconfiguration Complete" indicating a success in the modification process to the radio base station eNB#1 in step S1002.

Before the "RRC Connection Reconfiguration" including "transId(=n+1)" transmitted to the mobile station UE by the radio base station eNB#1 reaches the mobile station UE in step S1003B, if the mobile station UE detects RLF (failure in the RRC connection #1) in step S1003A, the mobile station UE performs a cell selection process in step S1004.

For example, the mobile station UE detects an out-of sync state in the RRC connection #1 N310 times and then activates a timer T310. When the out-of sync state is not solved until the timer T310 is expired, the mobile station UE detects the RLF.

In step S1005, the mobile station UE transmits the "RRC Connection Re-establishment Request" including the "PCI", the "C-RNTI", the "shortMAC-I", and the "transId(=n)" to the radio base station eNB#2 managing the cell #2 selected by the cell selection process.

At this time, the "transId" transmitted through the "RRC Connection Re-establishment Request" may include only lower bits of the "transId included in the "RRC Connection Reconfiguration" received in the mobile station UE in step S1001.

When it is determined that the context information of the mobile station UE corresponding to the "PCI", the "C-RNTI", the "shortMAC-I", and the "transId(=n)" included in the received "RRC Connection Re-establishment Request" is not stored in step S1006, the radio base station eNB#2 specifies the radio base station eNB#1 based on the "PCI" included in the received "RRC Connection Re-establishment Request", and transmits the "Forward HO Request (may also called a "UE Context Request" and the like)" including the above-mentioned "PCI", "C-RNTI", "short-MAC-I", and "transId(=n)" to the radio base station eNB#1 in step S1007.

When it is determined that the context information of the mobile station UE corresponding to the "PCI", the "C-RNTI", the "shortMAC-I", and the "transId(=n)" included in the received "Forward HO Request" is stored in step S1008, the radio base station eNB#1 transmits the "X2 HO Preparation" including the context information of the mobile station UE to the radio base station eNB#2 in step S1009 (when it is determined that the context information of the mobile station UE is not stored, the radio base station eNB#1 transmits "Forward HO Reject" instead of the "X2 HO Preparation").

In step S1010, the radio base station eNB#2 transmits the "RRC Connection Re-establishment" to the mobile station UE.

Here, when the "Forward HO Reject" is returned from the radio base station eNB#1, the radio base station eNB#2 transmits an "RRC Connection Re-establishment reject" instead. In this way, the connection re-establishment is ended unsuccessfully, and the mobile station UE releases the RRC connection and enters an "RRC_IDLE state".

In step S1011, the mobile station UE transmits the "RRC Connection Re-establishment Complete" to the radio base station eNB#2.

The radio base station eNB#2 transmits an "X2 HO Preparation Ack" to the radio base station eNB#1 in step S1012, transmits the "S1 Path Switch" to the mobile switching center MME in step S1013, and transmits the "RRC Connection Reconfiguration" including the "transId(=n+1)" to the mobile station UE in step S1014. At this time, the "transId" may have an arbitrary value.

In step S1015, the mobile station UE performs a process to modify the configuration of the connection in response to the "RRC Connection Reconfiguration". In the case of succeeding in the modification process, the mobile station UE transmits the "RRC Connection Reconfiguration Complete" to the radio base station eNB#2. In step S1016, the mobile switching center MME transmits the "S1 Path Switch Ack" to the radio base station eNB#2.

As a consequence, the RRC connection #1 is switched to an RRC connection #2 and the S1 connection #1 is switched to an S1 connection #2. Here, the RRC connection #2 is an RRC connection established between the mobile station UE and the radio base station eNB#2, and the S1 connection #2 is an S1 connection established between the radio base station eNB#2 and the mobile switching center MME.

Secondly, with reference to FIG. 9, an operation example 2 of the mobile communication system according to the first embodiment of the present invention will be explained.

Figure 9:
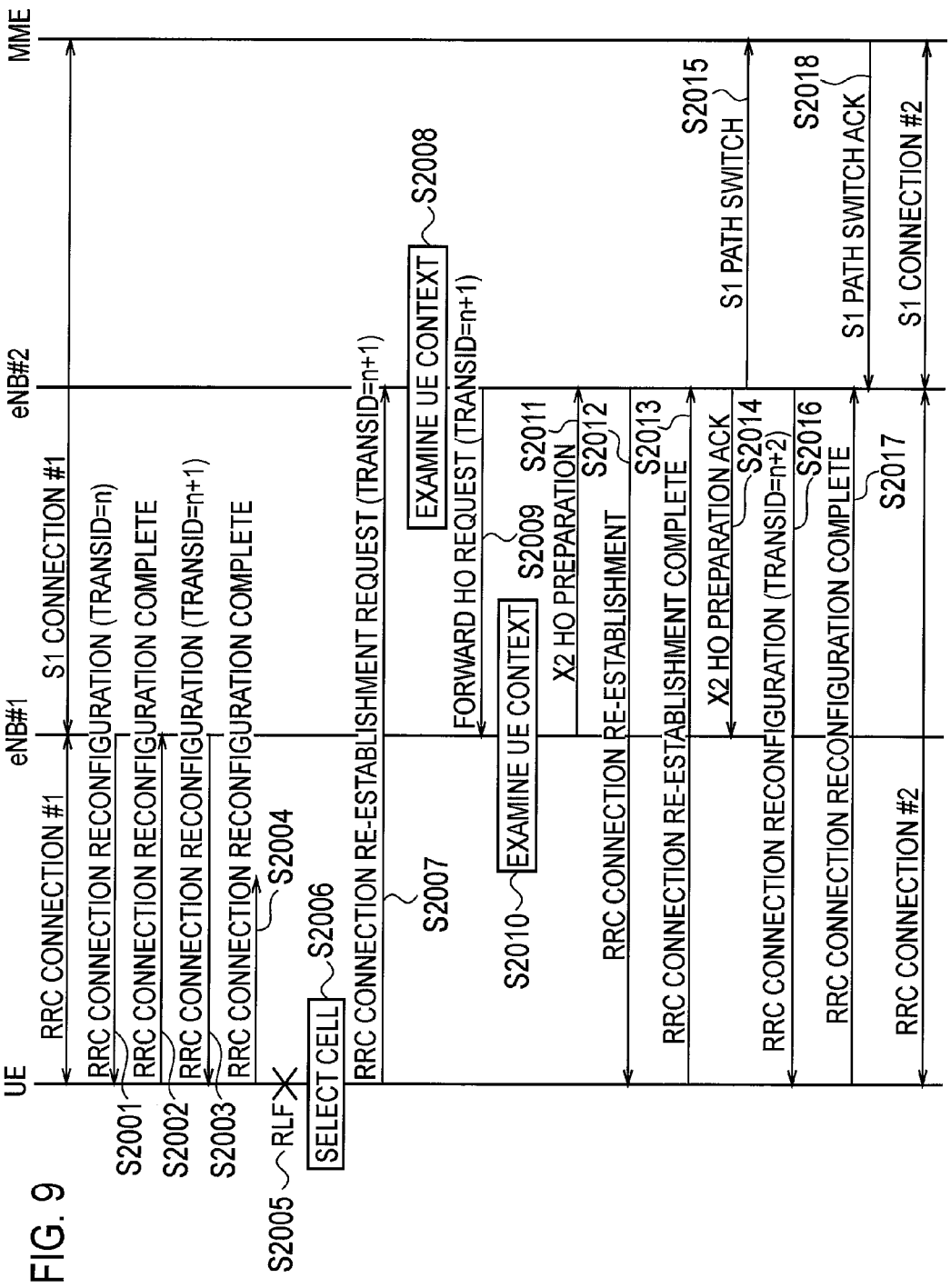
FIG. 9 is a sequence chart illustrating an operation of the mobile communication system according to the first embodiment of the present invention.

As illustrated in FIG. 9, in the state in which the RRC connection #1 is established between the mobile station UE and the radio base station eNB#1 and the S1 connection #1 is established between the radio base station eNB#1 and the mobile switching center MME, the radio base station eNB#1 managing the cell #1 transmits the "RRC Connection Reconfiguration" including the "transId(=n)" to the mobile station UE in order to perform a process (e.g., addition and deletion of a radio bearer) to modify the configuration of a connection of the mobile station UE in step S2001.

The mobile station UE performs the process to modify the configuration of the connection in response to the "RRC Connection Reconfiguration". In the case of succeeding in the modification process, the mobile station UE transmits the "RRC Connection Reconfiguration Complete" indicating a success in the modification process to the radio base station eNB#1 in step S2002.

In step S2003, the radio base station eNB#1 transmits the "RRC Connection Reconfiguration" including the "transId (=n+1)" to the mobile station UE.

The mobile station UE performs the process to modify the configuration of the connection in response to the "RRC Connection Reconfiguration". In the case of succeeding in the modification process, the mobile station UE transmits the "RRC Connection Reconfiguration Complete" indicating a success in the modification process to the radio base station eNB#1 in step S2004. However, before the "RRC Connection Reconfiguration Complete" reaches the radio base station eNB#1, if the mobile station UE detects a step RLF (failure in the RRC connection #1) in step S2005, the mobile station UE performs a cell selection process in step S2006.

In step S2007, the mobile station UE transmits the "RRC Connection Re-establishment Request" including the "PCI", the "C-RNTI", the "shortMAC-I", and the "transId(=n+1)" to the radio base station eNB#2 managing the cell #2 selected by the cell selection process.

At this time, the "transId" transmitted through the "RRC Connection Re-establishment Request" may include only lower bits of the "transId" included in the "RRC Connection Reconfiguration" received in the mobile station UE in step S2003.

When it is determined that the context information of the mobile station UE corresponding to the "PCI", the "C-RNTI", the "shortMAC-I", and the "transId(=n+1)" included in the received "RRC Connection Re-establishment Request" is not stored in step S2008, the radio base station eNB#2 specifies the radio base station eNB#1 based on the "PCI" included in the received "RRC Connection Re-establishment Request", and transmits the "Forward HO Request (may also called a "UE Context Request" and the like)" including the above-mentioned "PCI", "C-RNTI", "short-MAC-I", and "transId(=n+1)" to the radio base station eNB#1 in step S2009.

When it is determined that the context information of the mobile station UE corresponding to the "PCI", the "C-RNTI", the "shortMAC-I", and the "transId(=n+1)" included in the received "Forward HO Request" is stored in step S2010, the radio base station eNB#1 transmits the "X2 HO Preparation" including the context information of the mobile station UE to the radio base station eNB#2 in step S2011 (when it is determined that the context information of the mobile station UE is not stored, the radio base station eNB#1 transmits a "Forward HO Reject" instead of "the "X2 HO Preparation").

In step S2012, the radio base station eNB#2 transmits the "RRC Connection Re-establishment" to the mobile station UE.

Here, when the "Forward HO Reject" is returned from the radio base station eNB#1, the radio base station eNB#2 transmits an "RRC Connection Re-establishment reject" instead. In this way, the connection re-establishment is ended unsuccessfully, and the mobile station UE releases the RRC connection and enters an "RRC_IDLE state".

In step S2013, the mobile station UE transmits the "RRC Connection Re-establishment Complete" to the radio base station eNB#2.

The radio base station eNB#2 transmits an "X2 HO Preparation Ack" to the radio base station eNB#1 in step S2014, transmits the "S1 Path Switch" to the mobile switching center MME in step S2015, and transmits the "RRC Connection Reconfiguration" including "transId(=n+2)" to the mobile station UE in step S2016. At this time, the "transId" may have an arbitrary value.

In step S2017, the mobile station UE performs a process to modify the configuration of the connection in response to the "RRC Connection Reconfiguration". In the case of succeeding in the modification process, the mobile station UE transmits the "RRC Connection Reconfiguration Complete" to the radio base station eNB#2. In step S2018, the mobile switching center MME transmits the "S1 Path Switch Ack" to the radio base station eNB#2.

As a consequence, the RRC connection #1 is switched to an RRC connection #2 and the S1 connection #1 is switched to an S1 connection #2. Here, the RRC connection #2 is an RRC connection established between the mobile station UE and the radio base station eNB#2, and the S1 connection #2 is an S1 connection established between the radio base station eNB#2 and the mobile switching center MME.

In a mobile communication system including a plurality of carriers, there is a case in which the same radio base station eNB controls a plurality of overlaid cells with different carriers. In such a case, it is assumed that the same "PCI" is applied to the overlaid cells.

The mobile station UE performs the cell selection process when having detected the RLF. At this time, the mobile station UE may select a cell with a different carrier. Therefore, there is a problem that the context information of a mobile station UE in the radio base station eNB cannot be uniquely specified using only the "PCI" and the "C-RNTI".

Here, as described above, the "shortMAC-I" is obtained by extracting lower 16 bits of a falsification check code "MAC-I" calculated using a security key and a security algorithm, which are currently used by the mobile station UE, with respect to the "VarShortMAC-Input".

The security key is different in each mobile station UE, and is further updated whenever a communicating cell is changed. Thus, in a cell with a different carrier using the same "PCI", even if a mobile station UE using the same "C-RNTI" exists, the security key is different. Consequently, it is possible to uniquely specify the context information of the mobile station UE in the radio base station eNB using the "shortMAC-I".

The "shortMAC-I" is included in the "Forward HO Reject", so that it is possible to specify the context information of the mobile station UE in the radio base station eNB#1.

Further, the "transId" is included in the "RRC Connection Re-establishment Request" and the "Forward HO Request", so that it is possible to correctly recognize the state (the state of the configuration of the connection) of the context information of the mobile station UE in the radio base station eNB#1.

Operation and Effect of Mobile Communication System According to First Embodiment of the Present Invention In accordance with the mobile communication system according to the first embodiment of the present invention, even if the radio base station eNB#2 does not store the context information of the mobile station UE, since it is possible to acquire the context information of the mobile station UE from the radio base station eNB#1, the mobile station UE can perform connection re-establishment (reconnection) with respect to the radio base station eNB#2 which does not store the context information of the mobile station UE.

Further, in accordance with the mobile communication system according to the first embodiment of the present invention, before the "RRC Connection Reconfiguration" transmitted by the radio base station eNB#1 is received in the mobile station UE, even if the RLF in the RRC connection #1 is detected, the mobile station UE, the radio base station eNB#1, and the radio base station eNB#2 can correctly recognize the state of the configuration of the connection of the mobile station UE.

Moreover, in accordance with the mobile communication system according to the first embodiment of the present invention, before the "RRC Connection Reconfiguration Complete" transmitted by the mobile station UE reaches the radio base station eNB#1, even if the mobile station UE detects the RLF in the RRC connection #1, the mobile station UE, the radio base station eNB#1, and the radio base station eNB#2 can correctly recognize the state of the configuration of the connection of the mobile station UE.

(First Modification of the Present Invention)

Figure 11A:
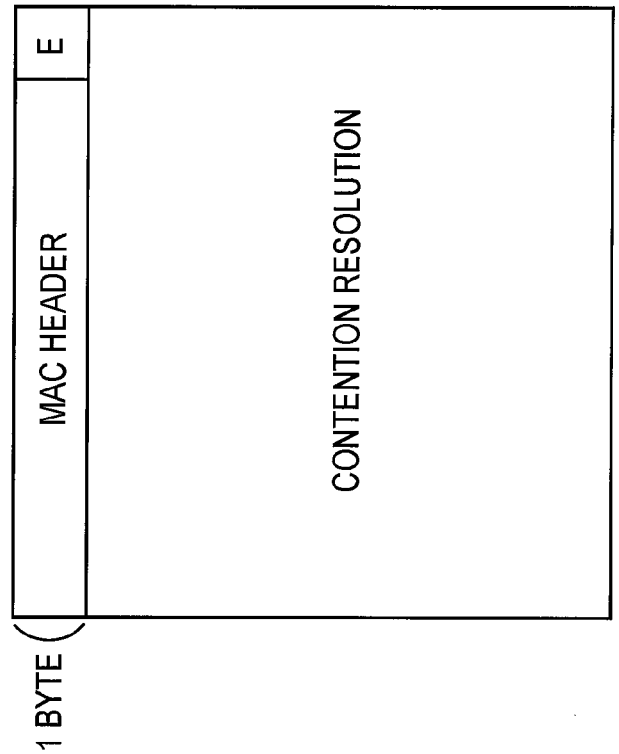
FIG. 11 is a diagram explaining the operation of the mobile communication system according to the First modification of the present invention.
Figure 11B:
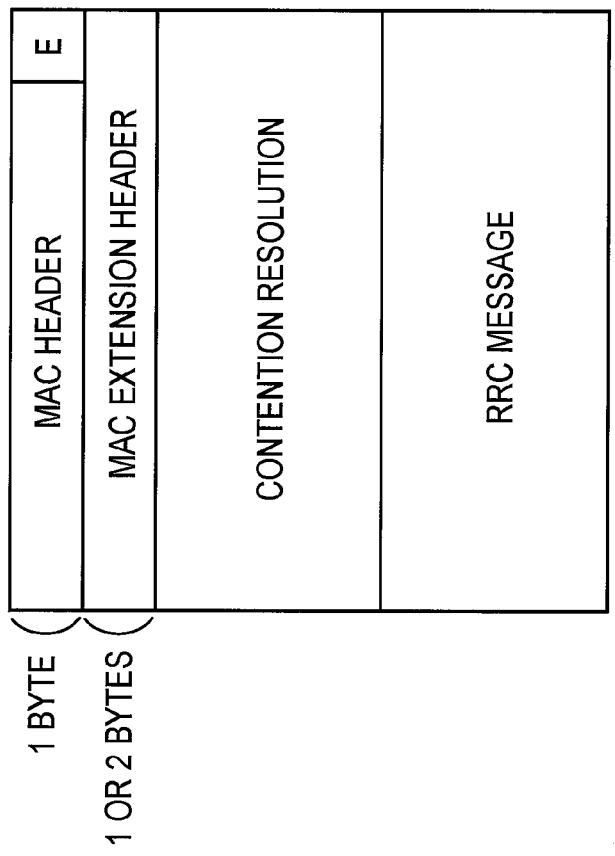
Figure 12:
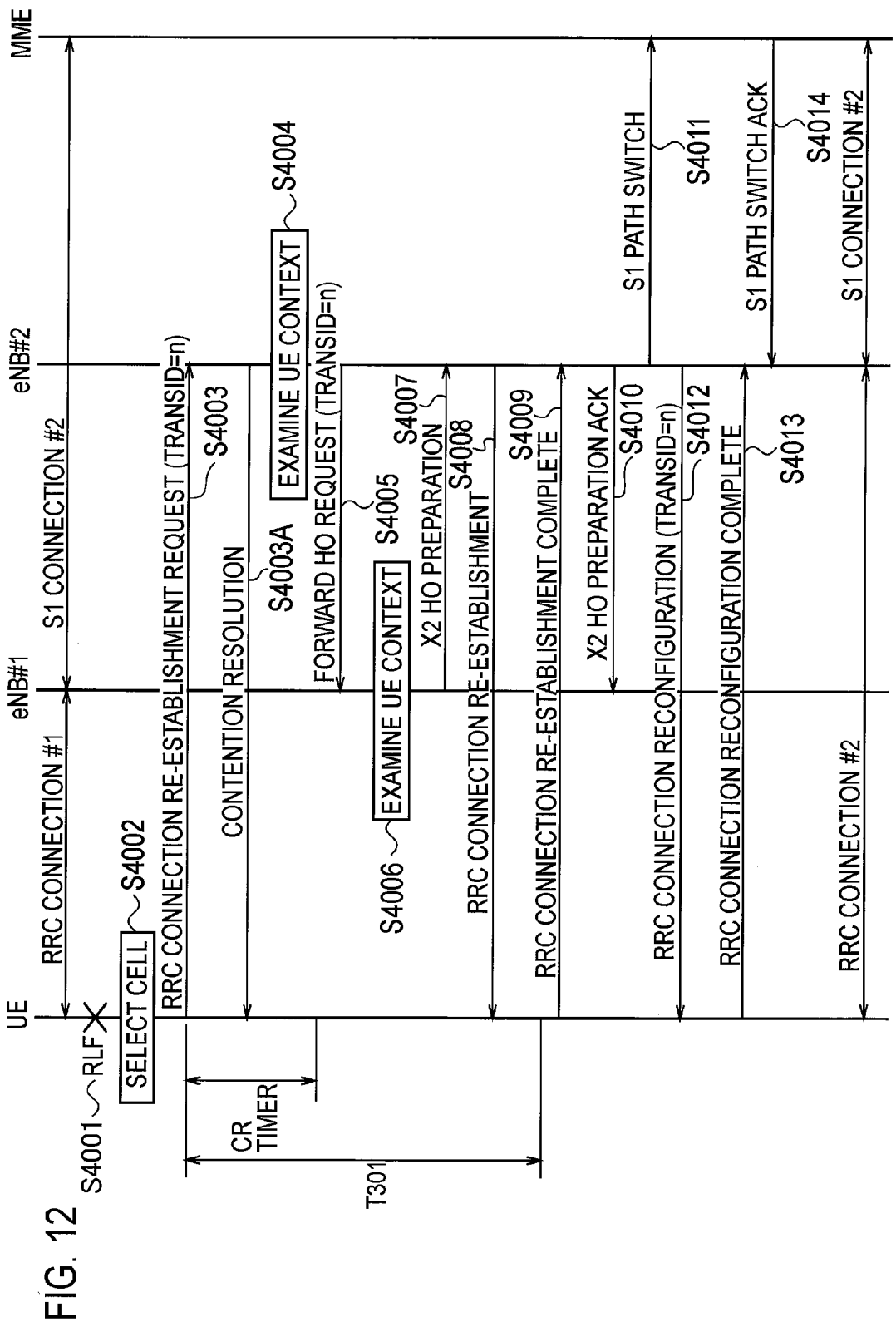
FIG. 12 is a sequence chart illustrating the operation of the mobile communication system according to First modification of the present invention.

With reference to FIG. 10 to FIG. 12, the mobile communication system according to the first modification of the present invention will be explained. Hereinafter, the mobile communication system according to the first modification will be explained while focusing on the difference relative to the mobile communication system according to the above-mentioned first embodiment.

In the mobile communication system according to the first modification, the mobile station UE is configured to transmit the "RRC Connection Re-establishment Request" to the radio base station eNB#2, which is selected by a cell selection process, using a random access sequence.

Hereinafter, with reference to FIG. 10 and FIG. 11, the operation of the mobile communication system will be explained.

As illustrated in FIG. 10, in step S3001, the mobile station UE transmits a random access preamble to the radio base station eNB#2.

In step S3002, the radio base station eNB#2 transmits a random access response to the mobile station UE in response to the received random access preamble. Here, the radio base station eNB#2 transmits the random access response to the mobile station UE via PDCCH including RA-RNTI.

In step S3003, the mobile station UE transmits the "RRC Connection Re-establishment Request" using an uplink radio resource (a UL Grant) designated by the random access response. An HARQ (Hybrid ARQ) process is applied to the transmission of the "RRC Connection Re-establishment Request".

In step S3004, the radio base station eNB#2 transmits a "Contention Resolution" in response to the reception of the "RRC Connection Re-establishment Request".

In step S3005, the radio base station eNB#2 transmits the "RRC Connection Re-establishment" which is a response signal of the "RRC Connection Re-establishment Request". The HARQ process is applied to the transmission of the "RRC Connection Re-establishment".

It is noted that the MAC processing unit 14 of the radio base station eNB#2 is configured to transmit the "Contention Resolution" before a CR (Contention Resolution) timer (a prescribed timer) is expired, which has been activated when the "RRC Connection Re-establishment Request" is transmitted by the mobile station UE.

Here, the MAC processing unit 14 of the radio base station eNB#2 may transmit the "Contention Resolution" in connection with the "RRC Connection Re-establishment" in the same TTI (Transmission Time Interval) as illustrated in FIG. 11a, or may transmit the "Contention Resolution" separately from the "RRC Connection Re-establishment" as illustrated in FIG. 11b.

It is noted that the MAC processing unit 14 of the radio base station eNB#2 is configured to copy the received "RRC Connection Re-establishment Request" into the field of the "Contention Resolution" illustrated in FIG. 11*a* and FIG. 11*b*.

Further, after transmitting the "RRC Connection Re-establishment Request" by the random access sequence, the mobile station UE initially is configured to determine whether the "Contention Resolution" is included in control information transmitted via PDCCH including Temp-C-RNTI.

The Temp-C-RNRI denotes a temporary C-RNTI (an identifier of the mobile station UE in a cell) assigned by the random access response.

Specifically, the mobile station UE may be configured to determine whether or not the "Contention Resolution" is included in the control information without analyzing an MAC header and an MAC extension header based on the fact that the field of the "Contention Resolution" starts from a third or fourth byte as illustrated in FIG. 11*a*. Also, the mobile station UE may be configured to determine whether the "Contention Resolution" is included or not without analyzing an MAC header based on the fact that the field of the "Contention Resolution" starts from a second byte as illustrated in FIG. 11*b*.

An HARQ is applied to the "Contention Resolution". However, since a plurality of mobile stations UEs simultaneously perform random access and a conflict may occur therebetween, the mobile stations UEs transmit a feedback of an HARQ Ack only when confirming the fact that "RRC Connection Re-establishment Requests" transmitted by themselves have been echoed-back by the "Contention Resolution", differently from a conventional MAC process of an HARQ.

In other cases (in the case of an HARQ Nack after decoding failure and in the case in which the details of echo-back by the "Contention Resolution" do not coincide with each other), the mobile stations UEs do not transmit an HARQ Ack/Nack feedback.

However, it is necessary to transmit the HARQ feedback at the timing satisfying an RTT (Round Trip Time) at which the HARQ operates. Therefore, a request for a processing speed is strict and it is not possible to take a processing time for analyzing the MAC header.

In this regard, it is preferable that the mobile station UE is configured to decide the byte position of the "Contention Resolution" without analyzing the MAC header, and directly perform a comparison of bit strings of the details of the echo-back.

Hereinafter, with reference to FIG. 12, the operation of the mobile communication system according to the first modification will be explained.

As illustrated in FIG. 12, in the state in which the RRC connection #1 has been established between the mobile station UE and the radio base station eNB#1 and the S1 connection #1 has been established between the radio base station eNB#1 and the mobile switching center MME, if the mobile station UE detects the RLF (failure in the RRC connection #1) in step S4001, the mobile station UE performs a cell selection process in step S4002.

In step S4003, the mobile station UE transmits the "RRC Connection Re-establishment Request" including the "PCI", the "C-RNTI", the "shortMAC-I", and the "transId(=n)" to the radio base station eNB#2 managing the cell #2 selected by the cell selection process.

At this time, in step S4003A, the radio base station eNB#2 transmits the "Contention Resolution" to the mobile station UE at an arbitrary timing before the CR timer is expired.

The operations of step S4004 to step S4014 are the same as the operations of step S1006 to step S1016 illustrated in FIG. 8.

It is noted that when the "RRC Connection Re-establishment" in step S4008 does not reach the mobile station UE until a timer T301 is expired, the mobile station UE determines that the establishment of the RRC connection #2 in the cell #2 is ended unsuccessfully. In such a case, the mobile station UE releases the RRC connection and enters the "RRC_IDLE state".

Hereinafter, the operation and effect of the mobile communication system according to the first modification will be explained.

In the mobile communication system according to the first embodiment of the present invention, when the radio base station eNB#2 receives the "RRC Connection Re-establishment Request" from the mobile station UE, if the radio base station eNB#2 does not store the context information of the mobile station UE corresponding to the "PCI", the "C-RNTI", the "shortMAC-I", and the "transId(=n)" included in the "RRC Connection Re-establishment Request", it is necessary to acquire the context information of the mobile station UE from the radio base station eNB#1.

Thus, if the radio base station eNB#2 transmits the "Contention Resolution" in connection with the "RRC Connection Re-establishment" in the same TTI, even if the "Contention Resolution" does not reach the mobile station UE until the CR timer is expired and the "RRC Connection Re-establishment Request" normally reaches the radio base station eNB#2, there is a case in which the random access sequence is repeated.

In this regard, as in the mobile communication system according to the first modification, the radio base station eNB#2 transmits the "Contention Resolution" to the mobile station UE at an arbitrary timing before the CR timer is expired, so that it is possible to solve such a problem.

Specifically, when the radio base station eNB#2 receives the "RRC Connection Re-establishment Request" from the mobile station UE, if the radio base station eNB#2 does not store the context information of the mobile station UE, it is preferable that the radio base station eNB#2 transmits the "Contention Resolution" to the mobile station UE at an arbitrary timing before the CR timer is expired.

(Second Modification of the Present Invention)

Figure 13:
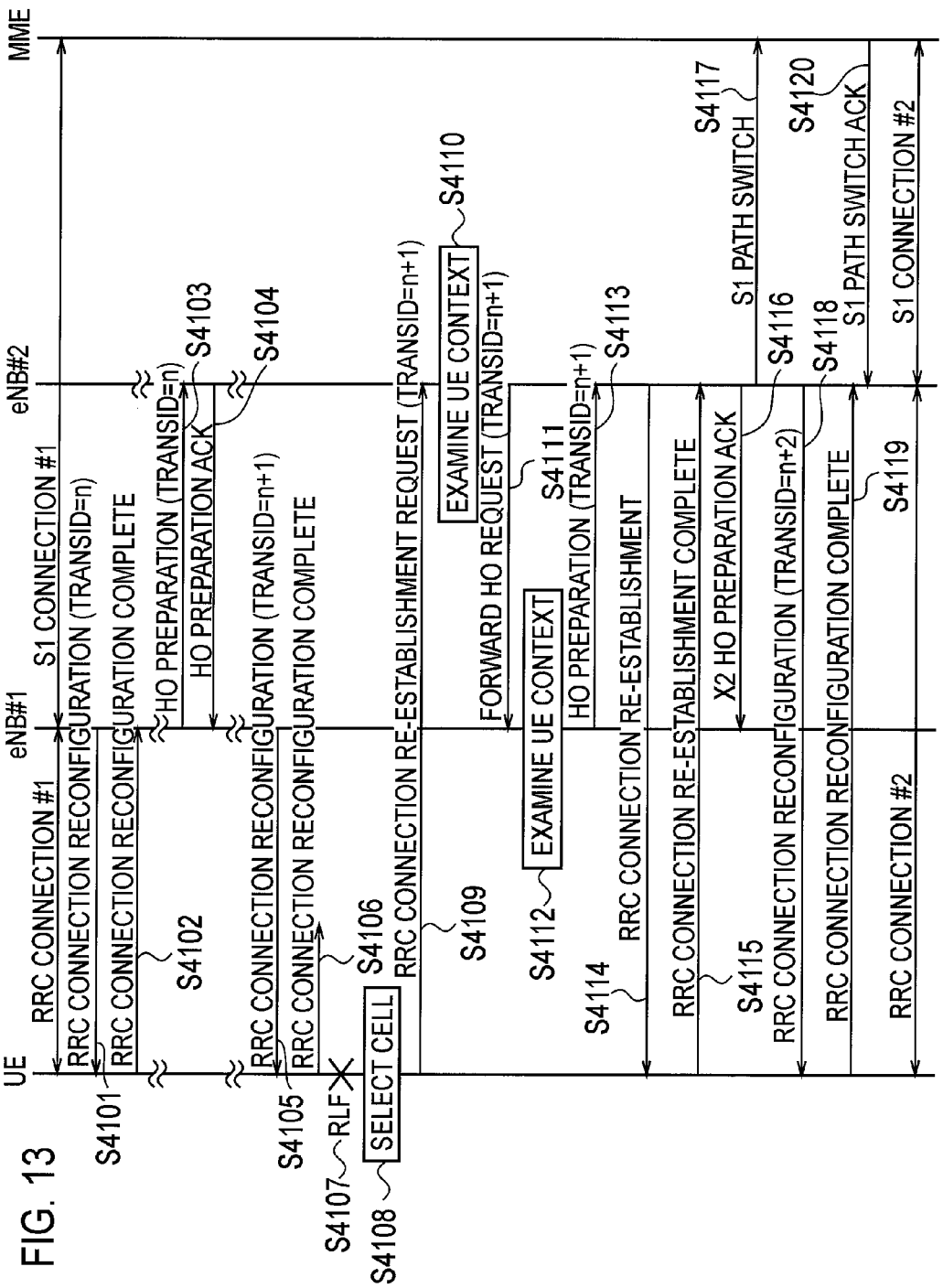
FIG. 13 is a sequence chart illustrating the operation of the mobile communication system according to a second modification of the present invention.
Figure 14:
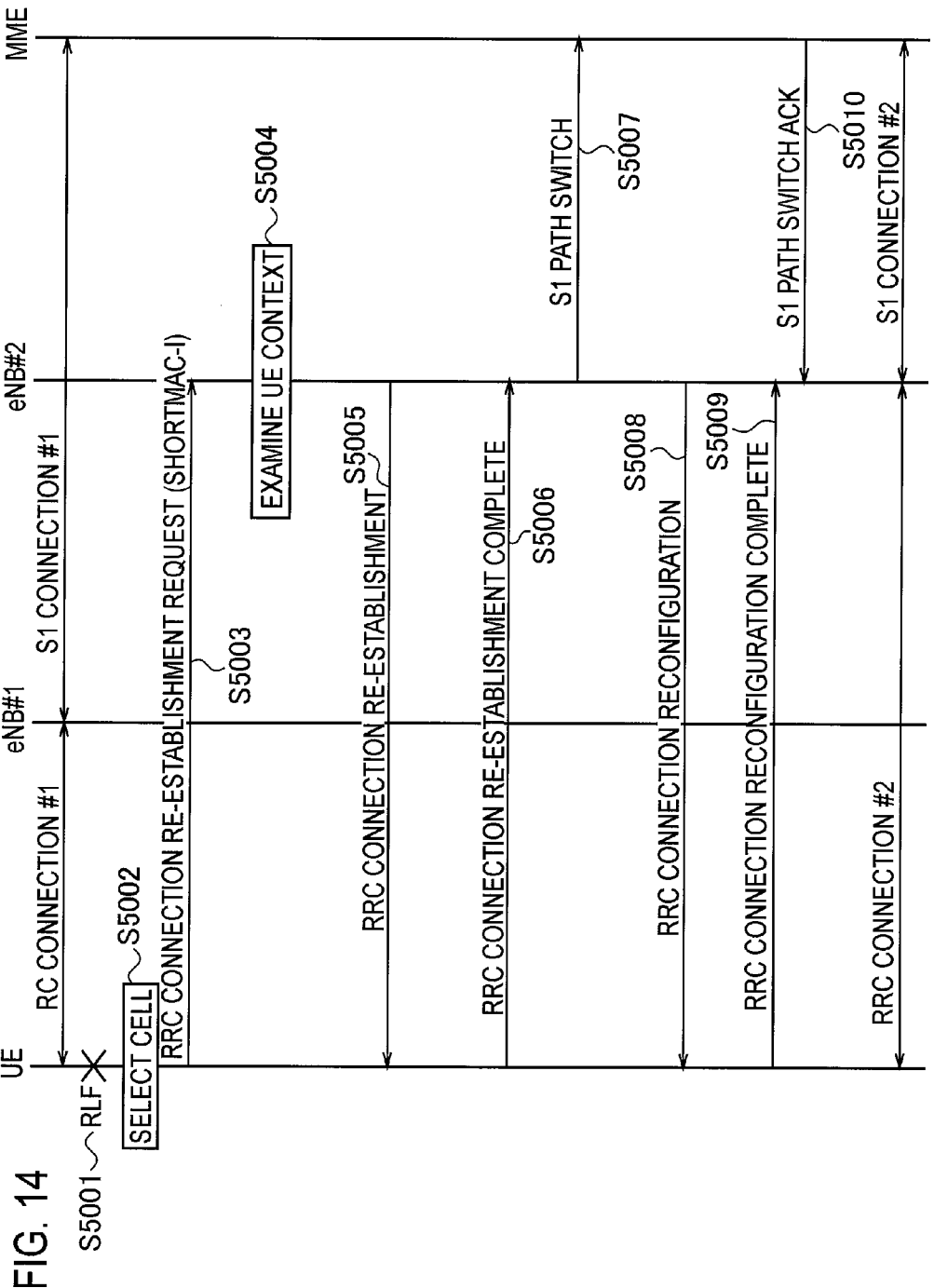
FIG. 14 is a sequence chart illustrating an operation of a conventional mobile communication system.

With reference to FIG. 13, the mobile communication system according to the second modification of the present invention will be explained. Hereinafter, the mobile communication system according to the first modification will be explained while focusing on the difference relative to the mobile communication system according to the above-mentioned first embodiment.

In the mobile communication system according to the present second modification, in the case of succeeding in a process to modify the configuration of a connection established between the mobile station UE and the radio base station eNB#1 in the cell #1, the X2 processing unit 15 of the radio base station eNB#1 updates "transId" and transmits "HO Preparation" including the updated "transId" to the radio base station eNB#2 at an arbitrary timing, thereby notifying the updated "transId".

Further, the UE context storage unit 11 of the radio base station eNB#2 is configured to update "transId" corresponding to the stored context information of the mobile station UE in response to the "transId" (the "transId" included in the "HO Preparation") notified by the radio base station eNB#1.

Hereinafter, with reference to FIG. 13, the operation of the mobile communication system according to the second modification of the present invention will be explained.

As illustrated in FIG. 13, in the state in which the RRC connection #1 has been established between the mobile station UE and the radio base station eNB#1 and the S1 connection #1 has been established between the radio base station eNB#1 and the mobile switching center MME, the radio base station eNB#1 managing the cell #1 transmits the "RRC Connection Reconfiguration" including the "transId(=n)" to the mobile station UE in order to perform a process (e.g., addition and deletion of a radio bearer) to modify the configuration of a connection of the mobile station UE in step S4101.

The mobile station UE performs the process to modify the configuration of the connection in response to the "RRC Connection Reconfiguration". In the case of succeeding in the modification process, the mobile station UE transmits the "RRC Connection Reconfiguration Complete" indicating a success in the modification process to the radio base station eNB#1 in step S4102.

In step S4103, the radio base station eNB#1 transmits the "HO Preparation" including the updated "transId(=n)" to the radio base station eNB#2 (a peripheral radio base station) at an arbitrary timing in consideration of the occurrence of an unexpected RLF.

The radio base station eNB#2 updates the context information of the mobile station UE based on the "transId(=n)" included in the received "HO Preparation", and transmits the "HO Preparation Ack" to the radio base station eNB#1 in step S4104.

In step S4105, the radio base station eNB#1 transmits the "RRC Connection Reconfiguration" including "transId(=n+1)" to the mobile station UE in order to perform a process (e.g., addition and deletion of a radio bearer) to modify the configuration of the connection of the mobile station UE.

The mobile station UE performs the process to modify the configuration of the connection in response to the "RRC Connection Reconfiguration". In the case of succeeding in the modification process, the mobile station UE transmits the "RRC Connection Reconfiguration Complete" indicating a success in the modification process to the radio base station eNB#1 in step S4106. However, before the "RRC Connection Reconfiguration Complete" reaches the radio base station eNB#1, if the mobile station UE detects a step RLF (failure in the RRC connection #1) in step S4107, the mobile station UE performs a cell selection process in step S4108.

In step S4109, the mobile station UE transmits the "RRC Connection Re-establishment Request" including the "PCI", the "C-RNTI", the "shortMAC-I", and the "transId(=n+1)" to the radio base station eNB#2 managing the cell #2 selected by the cell selection process.

In step S4110, the radio base station eNB#2 determines whether the context information of the mobile station UE corresponding to the "PCI", the "C-RNTI", the "shortMAC-I", and the "transId(=n+1)" included in the received "RRC Connection Re-establishment Request" is stored.

In the example of FIG. 13, the radio base station eNB#2 stores the context information of the mobile station UE corresponding to the "PCI", the "C-RNTI", and the "shortMAC-I" included in the received "RRC Connection Re-establishment Request".

However, since the "transId(=n)" corresponding to the context information of the mobile station UE is different from the "transId(=n+1)" included in the received "RRC Connection Re-establishment Request", when it is determined that the latest context information of the mobile station UE corresponding to the "PCI", the "C-RNTI", and the "shortMAC-I" included in the received "RRC Connection Re-establishment Request" is not stored, the radio base station eNB#2 specifies the radio base station eNB#1 based on the "PCI" included in the received "RRC Connection Re-establishment Request", and transmits the "Forward HO Request" including the above-mentioned "PCI", "C-RNTI", "shortMAC-I", and "transId(=n+1)" to the radio base station eNB#1 in step S4111.

The operations of step S4112 to step S4120 are the same as the operations of step S2010 to step S2018 illustrated in FIG. 9.

The aspects of the present embodiment as described above may be expressed as follows.

A first aspect of the present invention is summarized as a mobile communication method including the steps of: (A) performing, at a mobile station UE having established an RRC connection #1 (a first connection) in a cell #1 (a first cell), a modification process to modify a configuration of the RRC connection #1, in response to an "RRC Connection Reconfiguration (a reconfiguration signal)" from a radio base station eNB#1 managing the RRC connection #1; (B) storing, at the mobile station UE, "transId (transaction identification information)" included in the "RRC Connection Reconfiguration", and transmitting, from the mobile station UE to the radio base station eNB#1 managing the RRC connection #1, "RRC Connection Reconfiguration Complete (a reconfiguration complete signal)" including the stored "transId", when succeeding in the modification process; (C) performing, at the mobile station UE, a cell selection process when detecting failure (RLF) in the RRC connection #1; (D) transmitting, from the mobile station UE to a radio base station eNB#2 managing a cell #2 (a second cell) selected by the cell selection process, "RRC Connection Re-establishment Request (a connection re-establishment request signal)" including the "transId" and a "shortMAC-I (a security parameter)" capable of specifying the cell #1 and the mobile station UE; (E) determining, at the radio base station eNB#2 managing the cell #2, whether or not to have stored context information of the mobile station UE having transmitted "RRC Connection Re-establishment Request"; (F) transmitting, from the radio base station eNB#2 managing the cell #2 to the radio base station eNB#1 managing the cell #1, a "Forward HO Request (a context request signal)" including the "transId" and the "shortMAC-I", when the radio base station eNB#2 managing the cell #2 determines that it does not store the context information of the mobile station UE; (G) specifying, at the radio base station eNB#1 managing the cell #1 which has received the "Forward HO Request", the context information of the mobile station UE based on the "transId" and the "shortMAC-I", and transferring, from the radio base station eNB#1 managing the cell #1 to the radio base station eNB#2 managing the cell #2, the specified context information of the mobile station UE; and (H) establishing, at the radio base station eNB#2 managing the cell #2 and the mobile station UE, an RRC connection #2 in the cell #2 for the mobile station UE based on the context information of the mobile station UE.

In the first aspect of the present embodiment, in the step (E), the radio base station eNB#2 managing the cell #2 may determine whether or not the context information of the mobile station UE is stored based on a combination of the "transId" and the "shortMAC-I" included in the "RRC Connection Re-establishment Request".

In the first aspect of the present embodiment, the step (D) may further include the steps of: (D1) transmitting, from the mobile station UE to the radio base station eNB#2 managing the cell #2, a random access preamble; (D2) transmitting, from the radio base station eNB#2 managing the cell #2 to the mobile station UE, a random access response in response to the received random access preamble; (D3) transmitting, from the mobile station UE, the "RRC Connection Re-establishment Request" using a resource designated by the random access response; and (D4) transmitting, from the radio base station eNB#2 managing the cell #2, a "Contention Resolution (a contention resolution signal)" in response to reception of the "RRC Connection Re-establishment Request"; and in the step (D4), the radio base station eNB#2 managing the cell #2 may transmit the "Contention Resolution", separately from an "RRC Connection Re-establishment" which is a response signal of the "RRC Connection Re-establishment Request", before a CR timer (a prescribed timer) having been activated in the step (D1) is expired.

In the first aspect of the present embodiment, the mobile communication method may further include: a step of notifying, from the radio base station eNB#1 managing the cell #1 to the radio base station eNB#2 managing the cell #2, latest "transId" in the mobile station UE at an arbitrary timing, even if no failure (RLF) in the RRC connection #1 is detected.

A second aspect of the present embodiment is summarized as the radio base station eNB#2 managing the cell #2 includes: the determination unit 13 configured to determine whether or not the context information of the mobile station UE is stored based on a combination of the "transId" and the "shortMAC-I" included in the "RRC Connection Re-establishment Request" which is destined to the cell #2 and received from the mobile station UE having established the RRC connection #1 in the cell #1; the X2 processing unit 15 configured to acquire the context information of the mobile station UE from the radio base station eNB#1 managing the cell #1 when it is determined by the determination unit 13 that the context information of the mobile station UE is not stored; and the RRC processing unit 12 configured to establish the RRC connection #2 in the cell #2 for the mobile station UE in cooperation with the mobile station UE based on the context information of the mobile station UE, wherein the "transId" is configured such that the transaction identification information is to be updated in the case of a successful process to modify the configuration of the RRC connection in the mobile station UE.

In the second aspect of the present embodiment, the radio base station eNB#2 includes the MAC processing unit 14 configured to transmit the random access response to the mobile station UE in response to the random access preamble received from the mobile station UE, and to transmit the "Contention Resolution" in response to the reception of the "RRC Connection Re-establishment Request" received from the mobile station UE using a resource designated by the random access response, wherein the MAC processing unit 14 may be configured to transmit the "Contention Resolution", separately from an "RRC Connection Re-establishment" which is a response signal of the "RRC Connection Re-establishment Request", before the expiration of a CR timer having been activated when the "RRC Connection Re-establishment Request" is transmitted by the mobile station UE.

In the second aspect of the present embodiment, the radio base station eNB#2 may further include the UE context storage unit 11 configured to update "transId" corresponding to the stored context information of the mobile station UE in response to the "transId" (the "transId" included in the "HO Preparation") notified by the radio base station eNB#1 managing the cell #1.

A third aspect of the present embodiment is summarizes as the radio base station eNB#1 managing the cell #1 includes: the X2 processing unit 15 configured to update the "transId" in the case of succeeding in the process to modify the configuration of the RRC connection #1 established between the radio base station eNB#1 and the mobile station UE in the cell #1, and to transmit the "HO Preparation" including the updated "transId" to the radio base station eNB#2 managing the cell #2 at an arbitrary timing, thereby notifying the updated "transId".

The operation of the above-described mobile station UE, the radio base station eNB#1/eNB#2 and the mobile switching center MME may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE, the radio base station eNB#1/eNB#2 and the mobile switching center MME. As a discrete component, such a storing medium and processor may be arranged in the mobile station UE, the radio base station eNB#1/eNB#2 and the mobile switching center MME.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile communication method comprising the steps of:
(A) performing, at a mobile station having established a first connection in a first cell, a modification process to modify a configuration of the first connection, in response to a reconfiguration signal from a radio base station managing the first cell;
(B) storing, at the mobile station, transaction identification information included in the reconfiguration signal, and transmitting, from the mobile station to the radio base station managing the first cell, a reconfiguration complete signal including the stored transaction identification information, when succeeding in the modification process;
(C) performing, at the mobile station, a cell selection process when detecting failure in the first connection;
(D) transmitting, from the mobile station to a radio base station managing a second cell selected by the cell selection process, a connection re-establishment request signal including the transaction identification information and a security parameter for specifying the first cell and the mobile station;
(E) determining, at the radio base station managing the second cell, whether or not to have stored context information of the mobile station having transmitted the connection re-establishment request signal;
- (F) transmitting, from the radio base station managing the second cell to the radio base station managing the first cell, a context request signal including the transaction identification information and the security parameter, when the radio base station managing the second cell determines that it does not store the context information of the mobile station;
- (G) specifying, at the radio base station managing the first cell which has received the context request signal, the context information of the mobile station based on the transaction identification information and the security parameter, and transferring, from the radio base station managing the first cell to the radio base station managing the second cell, the specified context information of the mobile station; and
- (H) establishing, at the radio base station managing the second cell and the mobile station, a second connection in the second cell for the mobile station based on the context information of the mobile station.

2. The mobile communication method according to claim 1, wherein
in the step (E), the radio base station managing the second cell determines whether or not the context information of the mobile station is stored based on a combination of the transaction identification information and the security parameter included in the connection re-establishment request signal.

3. The mobile communication method according to claim 1, wherein
the step (D) further comprises the steps of:
- (D1) transmitting, from the mobile station to the radio base station managing the second cell, a random access preamble;
- (D2) transmitting, from the radio base station managing the second cell to the mobile station, a random access response in response to the received random access preamble;
- (D3) transmitting, from the mobile station, the connection re-establishment request signal using a resource designated by the random access response; and
- (D4) transmitting, from the radio base station managing the second cell, a contention resolution signal in response to reception of the connection re-establishment request signal; and in the step (D4), the radio base station managing the second cell transmits the contention resolution signal, separately from a connection re-establishment signal which is a response signal of the connection re-establishment request signal, before a prescribed timer having been activated in the step (D1) is expired.

4. The mobile communication method according to claim 1, further comprising:
a step of notifying, from the radio base station managing the first cell to the radio base station managing the second cell, latest transaction identification information in the mobile station at an arbitrary timing, even if failure in the first connection is not detected.

5. The mobile communication method according to claim 2, further comprising:
a step of notifying, from the radio base station managing the first cell to the radio base station managing the second cell, latest transaction identification information in the mobile station at an arbitrary timing, even if failure in the first connection is not detected.

6. The mobile communication method according to claim 3, further comprising:
a step of notifying, from the radio base station managing the first cell to the radio base station managing the second cell, latest transaction identification information in the mobile station at an arbitrary timing, even if failure in the first connection is not detected.

7. A radio base station managing a second cell, comprising:
a processor;
a determination unit configured to determine, using the processor, whether or not context information of a mobile station is stored based on a combination of transaction identification information and a security parameter for specifying a first cell and the mobile station, which are included in a connection re-establishment request signal destined to the second cell and received from the mobile station having established a first connection in the first cell;
an acquisition unit configured to acquire the context information of the mobile station from a radio base station managing the first cell, when it is determined by the determination unit that the context information of the mobile station is not stored;
an establishment unit configured to establish second connection in the second cell for the mobile station in cooperation with the mobile station based on the context information of the mobile station; and
a connection re-establishment request signal reception unit configured to transmit a random access response to the mobile station in response to a random access preamble received from the mobile station, and to transmit a contention resolution signal in response to reception of the connection re-establishment request signal received from the mobile station using a resource designated by the random access response,
wherein the connection re-establishment request signal reception unit is configured to transmit the contention resolution signal, separately from a connection re-establishment signal which is a response signal of the connection re-establishment request signal, before expiration of a prescribed timer having been activated at a time of transmitting the connection re-establishment request signal by the mobile station, and
wherein the transaction identification information is configured such that the transaction identification information is to be updated in a case of a successful process to modify a configuration of the first connection in the mobile station.

8. The radio base station according to claim 7, further comprising:
a management unit configured to update the transaction identification information corresponding to the stored context information of the mobile station in response to transaction identification information notified by the radio base station managing the first cell.

9. The radio base station according to claim 7, further comprising:
a management unit configured to update the transaction identification information corresponding to the stored context information of the mobile station in response to transaction identification information notified by the radio base station managing the first cell.

* * * * *